(12) United States Patent
Takayanagi

(10) Patent No.: US 8,300,957 B2
(45) Date of Patent: Oct. 30, 2012

(54) IMAGE PROCESSING APPARATUS, CONTROL METHOD FOR IMAGE PROCESSING APPARATUS, PROGRAM, AND STORAGE MEDIUM

(75) Inventor: Masahiro Takayanagi, Takasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1275 days.

(21) Appl. No.: 11/685,650

(22) Filed: Mar. 13, 2007

(65) Prior Publication Data

US 2007/0217697 A1 Sep. 20, 2007

(30) Foreign Application Priority Data

Mar. 15, 2006 (JP) ................................. 2006-071125

(51) Int. Cl.
*G06K 9/36* (2006.01)
(52) U.S. Cl. ...................................................... 382/232
(58) Field of Classification Search .................. None
See application file for complete search history.

(56) References Cited

U.S. PATENT DOCUMENTS

| | | | |
|---|---|---|---|
| 5,257,327 A * | 10/1993 | Hirosawa | 382/235 |
| 5,610,995 A | 3/1997 | Zheng et al. | |
| 5,748,780 A * | 5/1998 | Stolfo | 382/232 |
| 6,097,845 A | 8/2000 | Ng et al. | |
| 6,198,850 B1 | 3/2001 | Banton | |
| 6,634,559 B2 | 10/2003 | Shioda et al. | |
| 7,257,264 B2 * | 8/2007 | Nakayama et al. | 382/239 |
| 7,369,264 B2 * | 5/2008 | Kobayashi | 358/1.16 |
| 2003/0007695 A1 * | 1/2003 | Bossut et al. | 382/239 |
| 2003/0043905 A1 * | 3/2003 | Nakayama et al. | 375/240.04 |
| 2004/0095477 A1 | 5/2004 | Maki et al. | |
| 2005/0213150 A1 * | 9/2005 | Kobayashi | 358/1.15 |
| 2006/0023957 A1 * | 2/2006 | Ito | 382/232 |

FOREIGN PATENT DOCUMENTS

| | | |
|---|---|---|
| JP | 07-030759 A | 1/1995 |
| JP | 10-224540 A | 8/1998 |
| JP | 2001-344588 A | 12/2001 |
| JP | 2003-186635 A | 7/2003 |
| JP | 2003-189088 A | 7/2003 |
| JP | 2006-087043 A | 3/2006 |

* cited by examiner

*Primary Examiner* — Samir Ahmed
(74) *Attorney, Agent, or Firm* — Canon USA Inc. IP Division

(57) ABSTRACT

When an original image containing a code image is lossy-compressed, the image quality of the code image is deteriorated. Thus, due to the deterioration of the image quality of the code image, information contained in the code image cannot be acquired. Thus, a portion corresponding to the code image is not lossy compressed, and the portion corresponding to the code image, which has not been subjected to lossy compression, is stored in a storage unit.

15 Claims, 8 Drawing Sheets

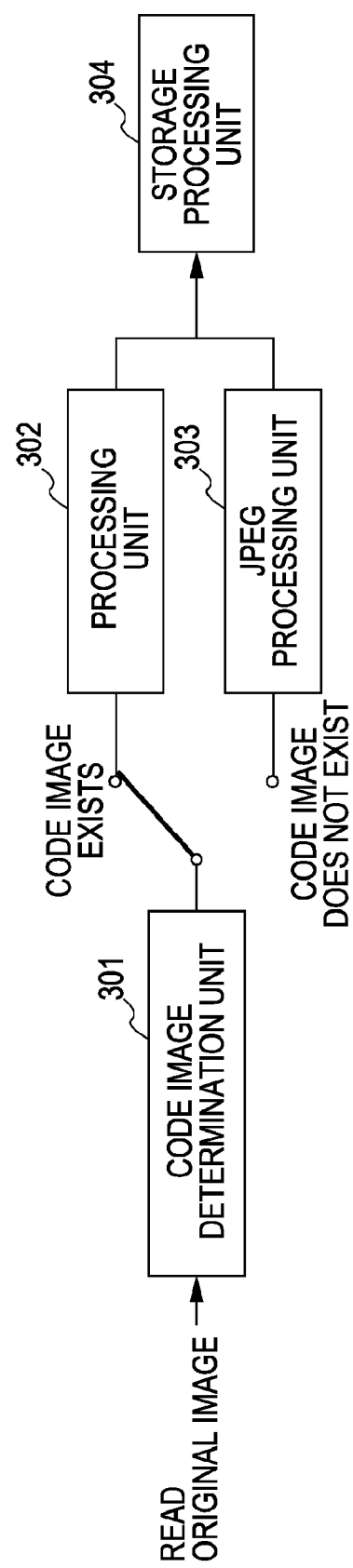

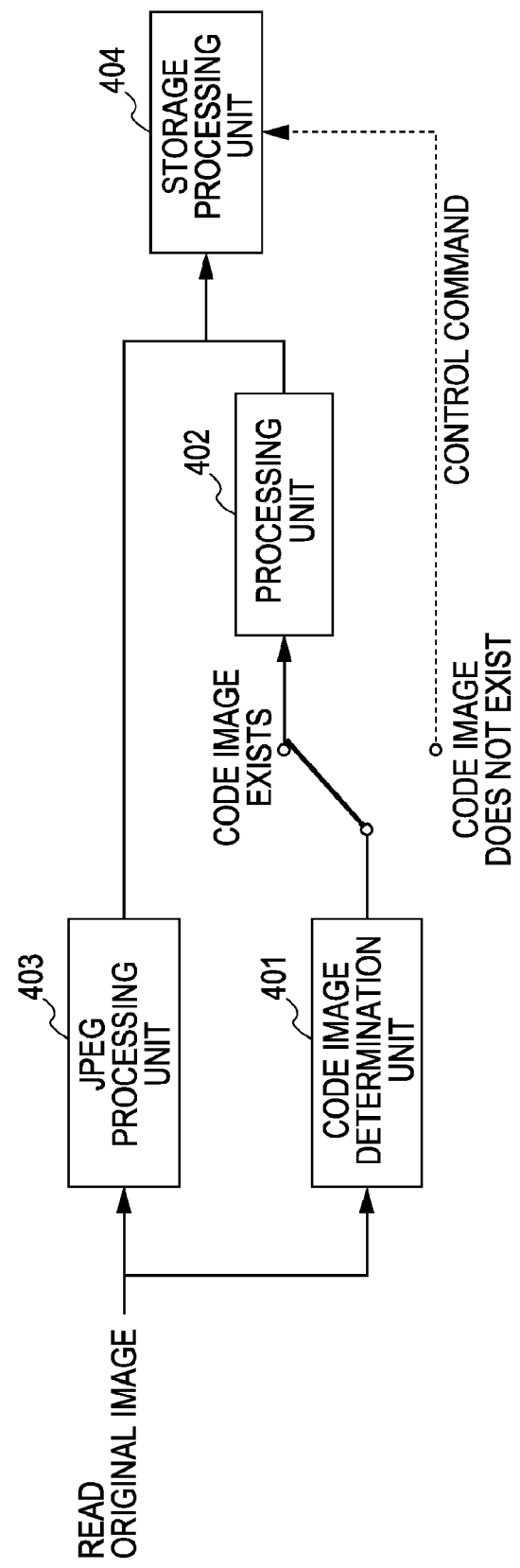

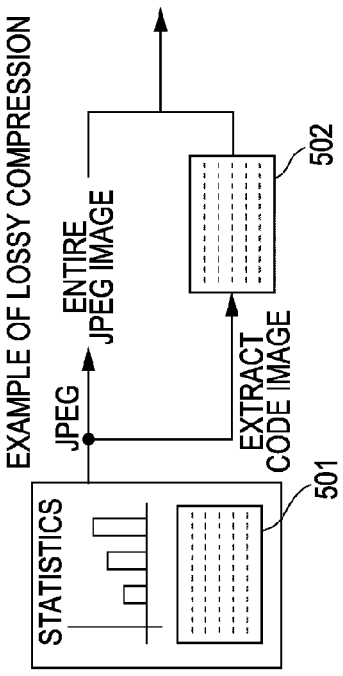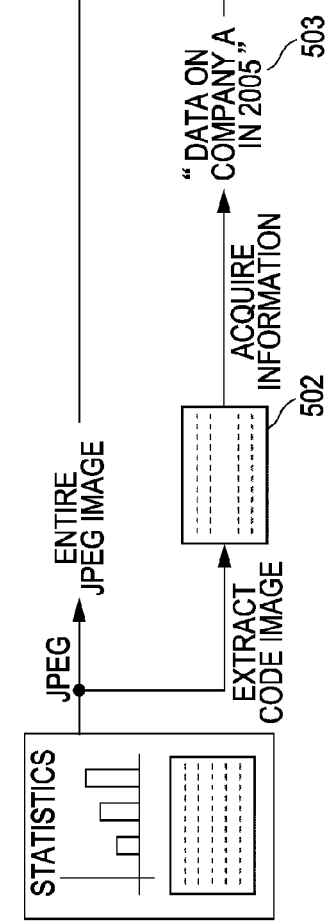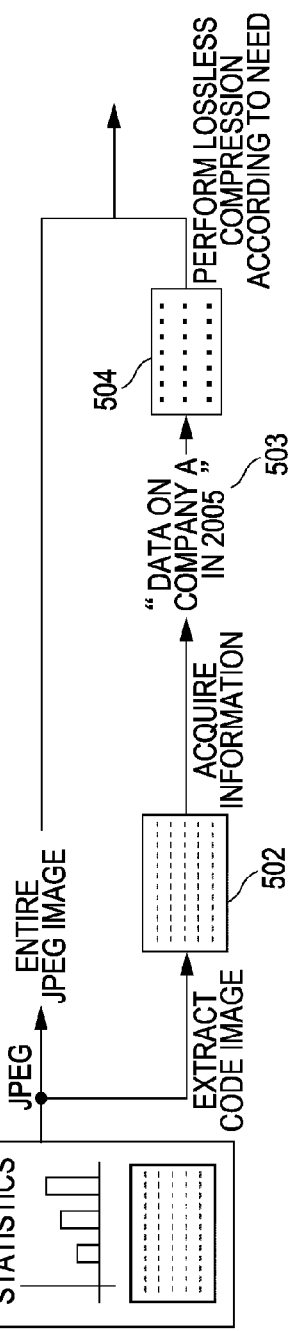

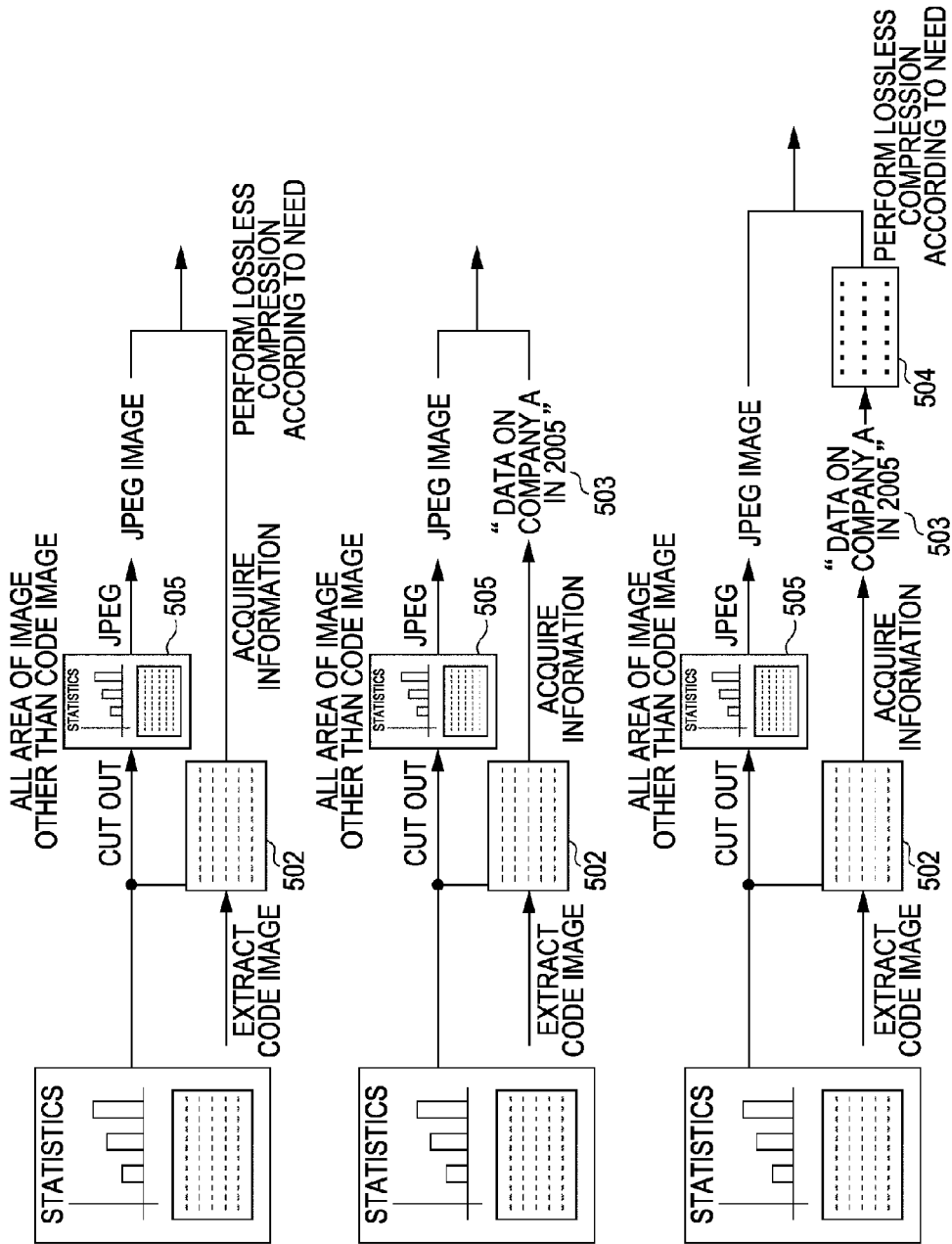

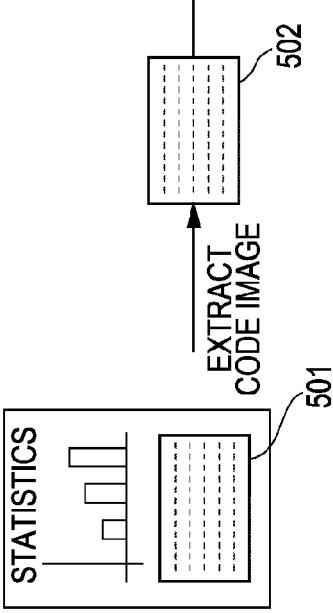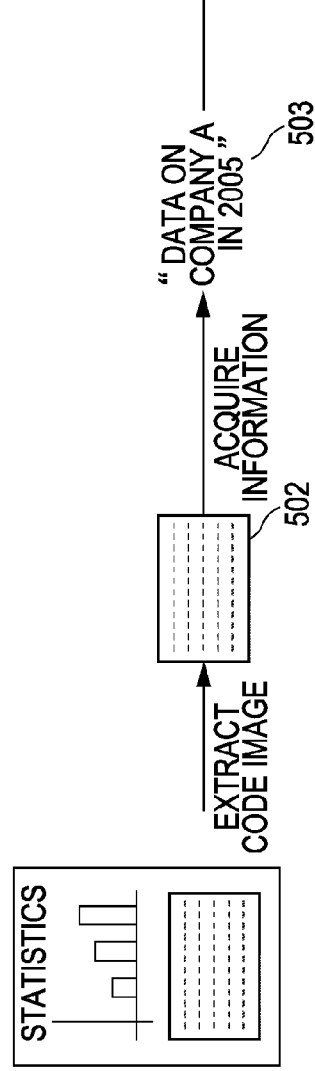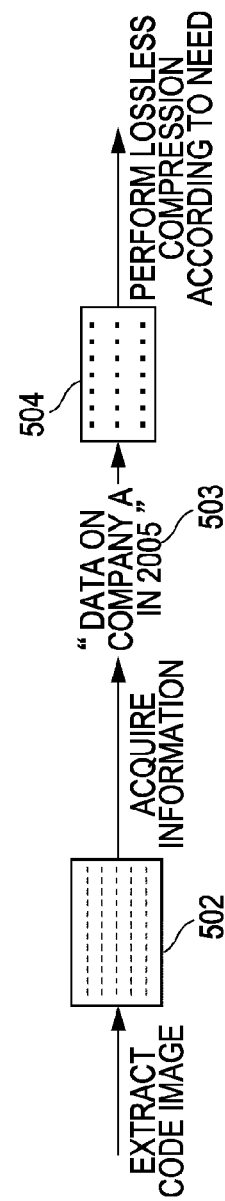

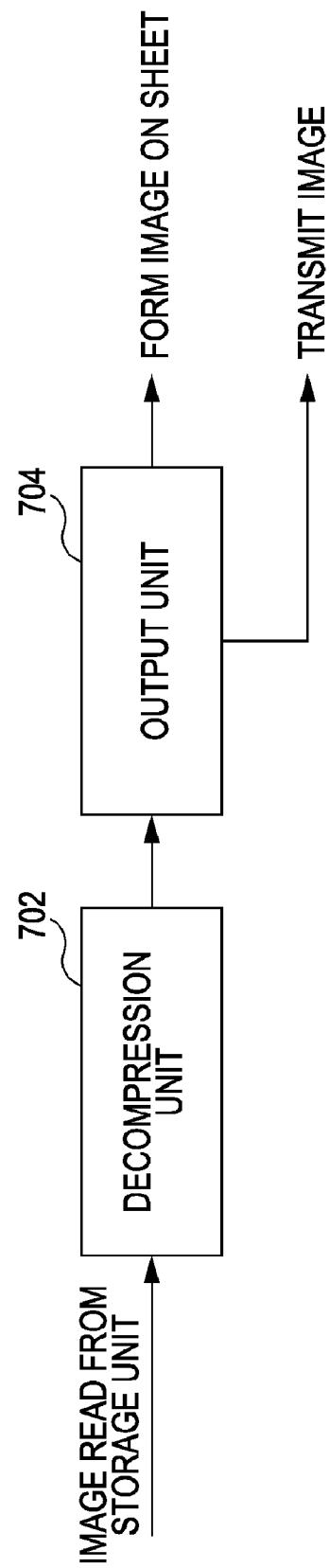

IMAGE PROCESSING APPARATUS, CONTROL METHOD FOR IMAGE PROCESSING APPARATUS, PROGRAM, AND STORAGE MEDIUM

CROSS REFERENCE TO RELATED APPLICATIONS

This application claims the benefit of Japanese Application No. 2006-071125 filed Mar. 15, 2006, which is hereby incorporated by reference herein in its entirety. This application is related to co-pending application Ser. No. 11/685,648 filed Mar. 13, 2007.

BACKGROUND OF THE INVENTION

1. Field of the Invention

The present invention relates to image processing apparatuses, control methods for image processing apparatuses, programs, and storage media.

2. Description of the Related Art

Barcode images and two-dimensional code images, which are black-and-white images, are generally known.

Such barcode images and two-dimensional images are generated by coding information. Images generated by coding information are referred to as code images herein.

In addition, a technology for scanning code images by bringing a reader close to the code images and for acquiring information from digital data obtained by the scanning is known.

FIGS. 1A and 1B are illustrations for explaining such a coding technology.

Referring to FIG. 1A, an original image 1 includes a code image, a character image, which is "Title", and a black-line image. The original image 1 is a sheet, not digital data.

When a user places the original image 1 on a scan plate of a multifunction machine 2 and gives an instruction for scanning, the multifunction machine 2 performs scanning on the original image 1 and obtains digital data by the scanning. In addition, the multifunction machine 2 recognizes that a code image is contained in the digital data and extracts the code image. Moreover, the multifunction machine 2 decodes the extracted code image to acquire information. If the acquired information is character information, the multifunction machine 2 converts the character information into a character image and prints out the character image. A sheet 3 is printed out. The sheet 3 includes a character image, which is, for example, "Performance of Company A in This Year", as shown in FIG. 1A. That is, it is clear that the code image contained in the original image 1 is an image generated by coding character information, which is "Performance of Company A in This Year".

In contrast, if the acquired information is image information, the image information is printed out. Referring to FIG. 1B, a sheet 13 is printed out. The sheet 13 contains an image representing a picture of fireworks. That is, the code image contained in an original image 11 is an image generated by coding image information representing the picture of fireworks.

Technologies for coding information and acquiring information from a code image are disclosed in Japanese Patent Laid-Open Nos. 10-224540 and 2001-344588.

However, when an original image containing a code image is lossy-compressed in a multifunction machine, the image quality of the code image is deteriorated. Thus, due to the deterioration of the image quality of the code image, information contained in the code image may not be able to be acquired.

Under such circumstances, performing storage processing such that information can be accurately acquired later and reducing the data size of an original image are desired.

SUMMARY OF THE INVENTION

Storage processing is performed such that information can be accurately acquired later by storing the information contained in a code image in a storage unit such that the information is not deteriorated, and the data size of an original image can be reduced.

According to an aspect of the present invention, an image processing apparatus includes: a determination unit configured to determine whether an original image contains a code image; and a first control unit configured to lossy-compress the original image and to store the lossy-compressed original image in a storage unit when the determination unit determines that the original image does not contain a code image. The image processing apparatus further includes a second control unit.

According to an aspect of the invention, the second control unit is configured to lossy-compress the original image, to store the lossy-compressed original image in the storage unit, to extract the code image from the original image that has not been subjected to lossy compression and to store the extracted code image in the storage unit without lossy-compressing the extracted code image when the determination unit determines that the original image contains a code image.

According to another aspect of the invention, the second control unit is configured to lossy-compress the original image, to store the lossy-compressed original image in the storage unit, to acquire information by decoding the code image contained in the original image that has not been subjected to lossy compression and to store the acquired information in the storage unit without lossy-compressing the acquired information when the determination unit determines that the original image contains a code image.

According to yet another aspect of the invention, the second control unit is configured to lossy-compress the original image, to store the lossy-compressed original image in the storage unit, to acquire information by decoding the code image contained in the original image that has not been subjected to lossy compression, to generate a new code image in accordance with the acquired information, and to store the generated new code image in the storage unit without lossy-compressing the generated new code image when the determination unit determines that the original image contains a code image.

According to yet another aspect of the invention, the second control unit is configured to extract the code image from the original image, to store the extracted code image in the storage unit without lossy-compressing the extracted code image, to lossy-compress an area of the original image that has not been subjected to lossy compression other than the extracted code image and to store the lossy-compressed area of the original image in the storage unit when the determination unit determines that the original image contains a code image.

According to still aspect of the invention, the second control unit is configured to extract the code image from the original image, to acquire information by decoding the extracted code image, to store the acquired information in the storage unit without lossy-compressing the acquired information, to lossy-compress an area of the original image that has not been subjected to lossy compression other than the extracted code image and to store the lossy-compressed area of the original image in the storage unit when the determination unit determines that the original image contains a code image.

According to still another aspect of the invention, the second control unit is configured to extract the code image from the original image, to acquire information by decoding the extracted code image, to generate a new code image from the acquired information, to store the generated new code image in the storage unit without lossy-compressing the generated new code image, to lossy-compress an area of the original image that has not been subjected to lossy compression other than the extracted code image and to store the lossy-compressed area of the original image in the storage unit when the determination unit determines that the original image contains a code image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 shows a configuration in which determination of whether or not to perform JPEG processing is performed after determination of whether or not a code image exists is performed.

FIG. 4 shows a configuration in which determination of whether or not a code image exists is performed while JPEG processing for an original image is performed.

FIG. 5A shows a configuration in which a JPEG image and a code image are stored.

FIG. 5B shows a configuration in which a JPEG image and information contained in a code image are stored.

FIG. 5C shows a configuration in which a JPEG image and a newly generated code image are stored.

FIG. 5D shows a configuration in which a code image and a JPEG image in an area other than the code image are stored.

FIG. 5E shows a configuration in which information contained in a code image and a JPEG image in an area other than the code image are stored.

FIG. 5F shows a configuration in which a new code image generated from information contained in a code image and JPEG image in an area other than the code image are stored.

FIG. 6A shows a configuration in which a code image is extracted.

FIG. 6B shows a configuration in which information acquired from a code image is stored.

FIG. 6C shows a configuration in which information is acquired from a code image and a new code image is generated from the information.

FIG. 7 shows a decompression unit and an output unit.

DESCRIPTION OF THE EMBODIMENTS

First Exemplary Embodiment

A first exemplary embodiment in which the present invention is applied to a multifunction machine (that is, multifunction office automation equipment having functions of a copying machine, a printing machine, a facsimile machine, and the like) will now be described. The multifunction machine includes a central processing unit (CPU) and a storage unit including a random-access memory (RAM), a read-only memory (ROM), and a hard disk drive (HDD). The multifunction machine also includes a scanner unit, a printer unit, an operation unit, and a transmission unit. The multifunction machine also includes a code image determination unit, a processing unit, a JPEG processing unit, and a storage processing unit, as shown in FIGS. 3 and 4. The CPU generally controls the operation of hardware other than the CPU. The RAM functions as a work area of the CPU. The RAM is also capable of storing various data. The ROM and the HDD are capable of storing various programs and various data. The scanner unit scans (reads) an original image placed on a document plate and obtains digital data. The printer unit forms an image of the received digital data on a sheet. An apparatus, for example a multifunction machine, that includes a CPU and that is capable of performing image processing on images is referred to as an image processing apparatus. In addition, an apparatus that is capable of forming images on sheets is referred to as an image forming apparatus.

Figure 1A:
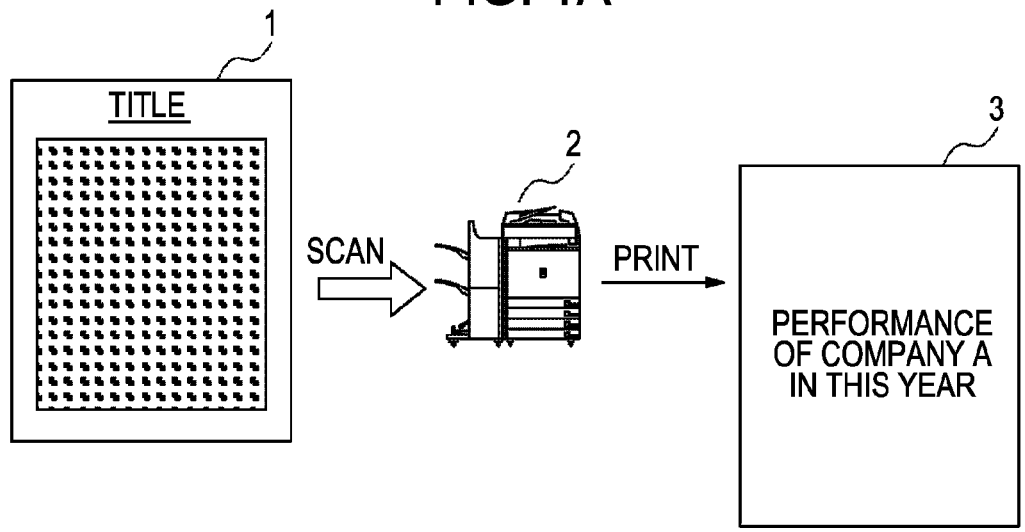
FIG. 1A shows an example of the related art.
Figure 1B:
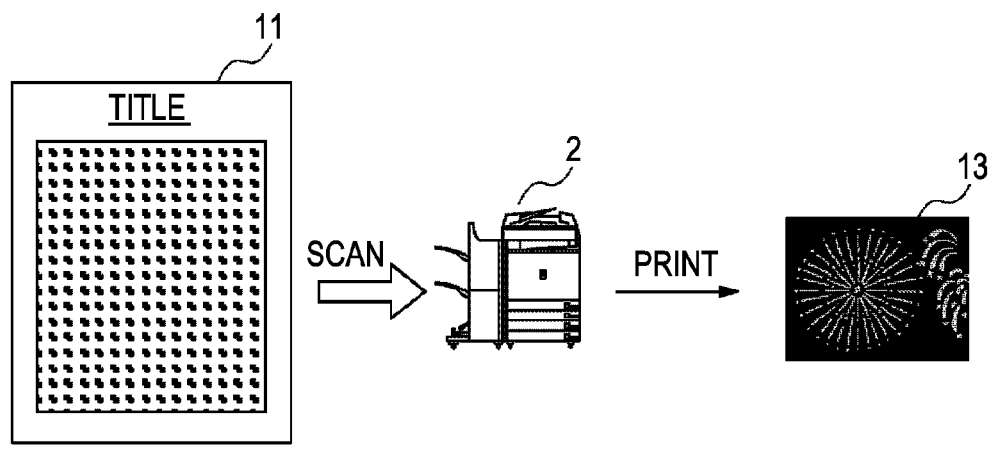
FIG. 1B shows another example of the related art.
Figure 2A:
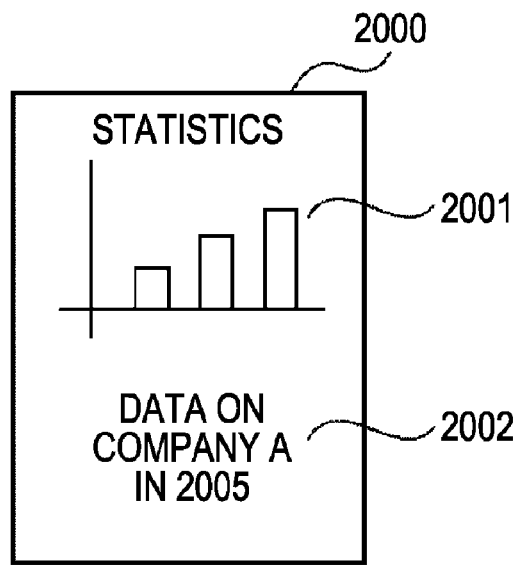
FIG. 2A shows an original image not containing a code image.

Referring to FIG. 2A, an original image 2000 does not contain a code image. The original image 2000 includes a graph image 2001 (that is, a graph image representing statistics) and a character image 2002 (that is, a character image representing "Data on Company A in 2005").

Figure 2B:
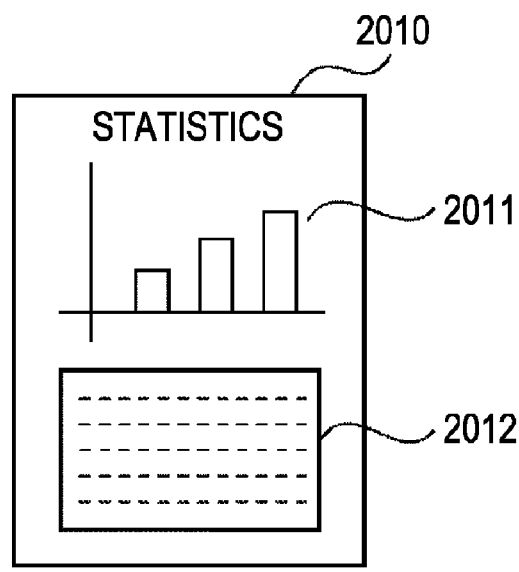
FIG. 2B shows an original image containing a code image.

Referring to FIG. 2B, an original image 2010 contains a code image. The original image 2010 includes a graph image 2011 (that is, a graph image representing statistics) and a code image 2012. The code image is an image generated by coding information, which is, for example, "Data on Company A in 2005".

FIG. 3 is a block diagram showing processing blocks that process original images of digital data obtained by the scanner unit. The blocks shown in FIG. 3 include a code image determination unit 301, a processing unit 302, a JPEG processing unit 303 and a storage processing unit 304. Processing performed by the processing unit 302 will be described later. The JPEG processing unit 303 compresses images using a known JPEG technology. In the present invention, the JPEG processing unit 303 may be any type of compression unit as long as it is capable of lossy-compressing an image to reduce the data size of the image. The same applies to other cases and other embodiments.

The read original image is first input to the code image determination unit 301. The code image determination unit 301 determines whether a code image is contained in the received original image.

If it is determined that a code image is not contained in the received original image, the original image is sent from the code image determination unit 301 to the JPEG processing unit 303. The JPEG processing unit 303 lossy-compresses the received original image and sends the lossy-compressed original image to the storage processing unit 304. The storage processing unit 304 stores the received (lossy-compressed) original image in a storage unit. This storage unit may be the storage unit contained in the multifunction machine. Alternatively, the storage unit may be a storage unit contained in an apparatus (for example, a server or another multifunction machine) connected to the above-described multifunction machine via a communication unit, such as a local-area network (LAN). The same applies to other cases in this embodiment and other embodiments.

If it is determined that a code image is contained in the received original image, the original image is sent from the code image determination unit 301 to the processing unit 302.

The processing unit 302 sends the received original image to the storage processing unit 304 without lossy-compressing the received original image. The storage processing unit 304 stores the received original image, which has not been subjected to lossy compression, in the storage unit.

In the above description, the processing unit 302 sends the received original image to the storage processing unit 304 without performing processing. However, for example, the processing unit 302 may lossless-compress the received original image and may send the lossless-compressed original image to the storage processing unit 304. When lossless compression is performed, the data size of an image can be reduced compared with a case where no processing is performed. Thus, a reduction in the necessary capacity of the storage unit can be effectively achieved.

In addition, for example, the processing unit 302 may be capable of performing processing shown by FIGS. 5A to 5F.

As shown in FIG. 5A, the processing unit 302 may lossy-compress the received original image and may extract a code image 501 contained in the original image. In this case, the processing unit 302 sends the lossy-compressed original image and the extracted code image 502 to the storage processing unit 304 such that the lossy compressed original image and the extracted code image are associated with each other. The storage processing unit 304 stores the received images, which are associated with each other, in the storage unit such that the images are associated with each other. The same applies to other cases and other embodiments. In FIG. 5A, unlike the above-described examples, the original image is lossy-compressed. Thus, a reduction in the data size of the original image can be effectively achieved.

As shown in FIG. 5B, the processing unit 302 may lossy-compress the received original image and may extract code image 502 contained in the original image to acquire information (for example, character information, which is, for example, "Data on Company A in 2005") from the extracted code image. In this case, the processing unit 302 sends the lossy-compressed original image and the acquired information 503 to the storage processing unit 304 such that the lossy-compressed original image and the acquired information are associated with each other. As described above, when the processing unit 302 sends the acquired information 503 to the storage processing unit 304, the data size can be further reduced. This is because, in general, the information volume of information contained in a code image is smaller than the information volume of the code image.

As shown in FIG. 5C, the processing unit 302 may lossy-compress the received original image and may extract a code image 502 contained in the original image to acquire information 503 from the extracted code image and to generate a new code image in accordance with the acquired code information.

It is desirable that the new code image be generated, in consideration of the image-forming capability of the printer unit, in accordance with the acquired information. This is because, if the processing unit 302 generates a barcode image using 1200 lines or 2400 lines in an environment in which the printer unit can perform dot formation with a resolution of only 600 DPI, image formation of the generated barcode image cannot be achieved accurately.

However, in the case shown in FIG. 5C, a new code image 504 is not necessarily generated in consideration of the image-forming capability of the printer unit. This is because a barcode image may be generated using 1200 lines or 2400 lines and the generated barcode image may be sent to an external high-precision multifunction machine. Whatever the case may be, in the example shown in FIG. 5C, since a new code image 504 is generated in advance and stored, processing for image formation can be quickly performed.

In addition, the processing shown in FIG. 5D may be performed. That is, the processing unit 302 extracts a code image contained in the received original image, and sends the extracted code image 502 to the storage processing unit 304. The processing unit 302 also cuts out an area of the original image other than the code image, lossy-compresses the cut-out area of the original image, and sends the lossy-compressed area 505 of the original image to the storage processing unit 304. Although the extracted code image 502 should not be lossy-compressed, the processing unit 302 may lossless-compress the extracted code image and send the lossless-compressed code image to the storage processing unit 304. Unlike the processing shown in FIG. 5A in which the entire original image is lossy-compressed, an area of the original image other than the code image is lossy-compressed and the lossy-compressed area of the original image is sent to the storage processing unit 304 in the processing shown in FIG. 5D. Thus, the data size can be further reduced.

In addition, the processing shown in FIG. 5E may be performed. That is, the processing unit 302 extracts a code image 502 contained in the received original image, acquires information from the extracted code image, and sends the acquired information 503 to the storage processing unit 304. The processing unit 302 also cut outs an area of the original image other than the code image, lossy-compresses the cut-out area of the original image, and sends the lossy-compressed area of the original image 505 to the storage processing unit 304. Although the acquired information 503 should not be lossy-compressed, the processing unit 302 may lossless-compress the acquired information 503 and send the lossless-compressed information to the storage processing unit 304. Unlike the processing shown in FIG. 5B in which the entire original image is lossy-compressed, an area of the original image other than the code image is lossy-compressed and the lossy-compressed area of the original image is sent to the storage processing unit 304 in the processing shown in FIG. 5E. Thus, the data size can be further reduced.

In addition, the processing shown in FIG. 5F may be performed. That is, the processing unit 302 extracts a code image 502 contained in the received original image, acquires information from the extracted code image, generates a new code image in accordance with the acquired information 503, and sends the generated new code image 504 to the storage processing unit 304. The processing unit 302 also cuts out an area of the original image other than the code image, lossy-compresses the cut-out area of the original image, and sends the lossy-compressed area of the original image 505 to the storage processing unit 304. Although the generated new code image should not be lossy-compressed, the processing unit 302 may lossless-compress the new code image and send the lossless-compressed new code image to the storage processing unit 304. Unlike the processing shown in FIG. 5C in which the entire original image is lossy-compressed, an area of the original image other than the code image is lossy-compressed and the lossy-compressed area of the original image is sent to the storage processing unit 304 in the processing shown in FIG. 5F. Thus, the data size can be further reduced.

In each of the configurations described above, for an original image containing a code image, information missing in code information (that is, deterioration of the image quality of the code image) is prevented. In addition, for an original image not containing a code image, the original image is lossy-compressed and then stored in the storage unit.

As described above, in the first embodiment, an image can be stored such that code information can be accurately acquired later and the data size of the original image can be reduced.

Second Embodiment

In general, multifunction machines are configured such that an original image is stored in a storage unit in order to make a copy of the original image. In such multifunction machines, copying of original images not containing code images is performed more often than copying of original images containing code images. Thus, when an instruction for copying an original image not containing a code image is given, a copy of the original image should be output more quickly.

In the first embodiment, lossy compression is performed or not performed in accordance with determination of whether or not an original image contains a code image. That is, lossy compression is performed after determination of the existence of a code image is completed. In contrast, in the second embodiment, in parallel to lossy compression of a read original image, determination of whether the original image contains a code image is performed. In other words, in parallel to determination of whether the read original image contains a code image, lossy compression of the read original image is performed.

With this configuration, lossy compression is able to start before completion of the determination of the existence of a code image, unlike the first embodiment in which lossy compression starts after completion of the determination of the existence of a code image. As described above, the lossy compression is able to start earlier and thus be able to end earlier. Therefore, the lossy-compressed original image can be stored in the storage unit more quickly. As a result, if an original image does not contain a code image, a copy of the original image can be output more quickly.

FIG. 7 illustrates a decompression unit and an output unit provided in the image processing apparatus according to the first embodiment or the second embodiment.

If an image stored in the storage unit is compressed, the decompression unit 702 decompresses the image and outputs the decompressed image to the output unit 704. If an image stored in the storage unit is not compressed, the decompression unit 702 outputs the image to the output unit 704 without performing decompression.

The output unit 704 is capable of forming on a sheet an image received from the decompression unit 702 and sending the image (for example, by facsimile transmission or the like).

FIG. 4 is a block diagram showing processing blocks that process original images of digital data obtained by the scanner unit. The processing blocks shown in FIG. 4 include a code image determination unit 401, a processing unit 402, a JPEG processing unit 403 and a storage processing unit 404.

The read original image is input in parallel to the JPEG processing unit 403 and the code image determination unit 401. The JPEG processing unit 403 lossy-compresses the received original image, and sends the lossy-compressed original image to the storage processing unit 404. The code image determination unit 401 determines whether the received original image contains a code image. Each of the JPEG processing unit 403 and the code image determination unit 401 starts corresponding processing when the original image is received. Thus, lossy compression performed by the JPEG processing unit 403 and determination performed by the code image determination unit 401 as to whether the original image contains a code image are performed in parallel with each other.

If the code image determination unit 401 determines that the original image does not contain a code image, the code image determination unit 401 terminates the processing. In this case, the storage processing unit 404 stores in the storage unit only the original image received from the JPEG processing unit 403.

If the code image determination unit 401 determines that the original image contains a code image, the original image is sent from the code image determination unit 401 to the processing unit 402.

Processing shown in FIGS. 6A, 6B, and 6C may be performed by the processing unit 402.

In the processing shown in FIG. 6A, the processing unit 402 extracts a code image 501 from the received original image. The processing unit 402 sends the extracted code image 502 to the storage processing unit 404 without performing lossy compression. The storage processing unit 404 stores the original image received from the JPEG processing unit 403 and the code image 502 received from the processing unit 402 in the storage unit such that the original image and the code image are associated with each other. However, if the original image that has been lossy-compressed by the JPEG processing unit 403 must be quickly stored in the storage unit (for example, a case where an instruction for quick output of a copy of the original image is given, a case where an instruction for quick transmission is given, or the like), the storage processing unit 404 stores the lossy-compressed original image in the storage unit immediately after receiving the lossy-compressed original image. That is, before extraction of the code image is completed, the lossy-compressed original image is stored in the storage unit. In addition, it is desirable that the decompression unit decompress the lossy-compressed image and send the decompressed image to the output unit (for example, the printer unit or the transmission unit) before the extraction of the code image is completed. As described above, when processing for the original image received from the JPEG processing unit 403 proceeds without waiting for the completion of the extraction of the code image, more quick output of a copy of the original image and more quick transmission can be achieved.

Although the case where the processing unit 402 sends the extracted image to the storage processing unit 404 without performing processing has been described above, the present invention is not limited to this case. For example, the processing unit 402 may lossless-compress the extracted code image and send the lossless-compressed code image to the storage processing unit 404. If the code image is lossless-compressed, the data size of the code image is further reduced. Thus, a reduction in the necessary capacity of the storage unit can be effectively achieved.

In the processing shown in FIG. 6B, the processing unit 402 extracts a code image 502 from the received original image, and acquires information 503 from the extracted code image. In this case, the processing unit 402 sends the acquired information 503 to the storage processing unit 404. The storage processing unit 404 stores the original image received from the JPEG processing unit 403 and the information 503 received from the processing unit 402 in the storage unit such that the original image and the information are associated with each other. Unlike the processing shown in FIG. 6A in which the code image is sent to the storage processing unit 404, the code information is sent to the storage processing unit 404 in the processing shown in FIG. 6B. In general, since the information volume of information contained in a code image is smaller than the information volume of the code image, a reduction in the data size achieved in the processing shown in FIG. 6B is greater than a reduction in the data size achieved in the processing shown in FIG. 6A. In addition, if the original image that has been lossy-compressed by the JPEG processing unit 403 must be quickly stored in the storage unit, corresponding processing similar to the case shown in FIG. 6A is performed.

In the processing shown in FIG. 6C, the processing unit 402 extracts a code image from the received original image, acquires information 503 from the extracted code image 502, and generates a new code image 504 in accordance with the acquired information. In this case, the processing unit 402 sends the generated new code image 504 to the storage processing unit 404. The storage processing unit 404 stores the original image received from the JPEG processing unit 403 and the new code image 504 received from the processing unit 402 in the storage unit such that the original image and the new code image are associated with each other. It is desirable that the new code image be generated, in consideration of the image-forming capability of the printer unit, in accordance with the acquired information, as in the first embodiment. In addition, if the original image that has been lossy-compressed by the JPEG processing unit 403 must be quickly stored in the storage unit, corresponding processing similar to the case shown in FIG. 6A is performed.

As described above, in the second embodiment, storage processing is performed such that information can be accurately acquired later and the data size of the original image can be reduced. In addition, the original image can be quickly stored in the storage unit. Thus, a user who merely wants to make a copy of an original image not containing a code image is able to quickly obtain the copy of the original image.

If an instruction for outputting a copy of the original image, for sending image data, or the like is given by a user and the original image (and/or a code image and code information) stored in the storage unit needs to be output, the processing described below may be performed.

As described above, processing for quickly outputting only the original image may be performed. In this case, a code image contained in the original image (the case shown in FIG. 6A), information acquired from the code image (the case shown in FIG. 6B), and a newly generated code image (the case shown in FIG. 6C) may be output later.

Alternatively, processing for outputting the original image and the code image (or the code information) to be printed on front and back sides of a sheet may be performed.

Alternatively, processing for embedding the generated new code image in the original image and outputting the original image in which the generated new code image is embedded (for example, processing for superimposing a new code image 504 in an area 501 of the original image that originally corresponds to a code image) may be performed.

In contrast, if a storage instruction is given by a user using the operation unit or the like, processing is performed in the order described above in this embodiment. For the original image stored in the storage unit, a new instruction may be given via the operation unit or the like (for example, a transmission instruction or an image formation instruction). If the new instruction is given, control is performed in accordance with the given instruction.

Other Embodiments

In each of the first and second embodiments, an example of an original image in which a code image is disposed in an area different from the other images, as shown in FIG. 2B, has been described. However, the present invention is not limited to this. For example, the code image and the other images (for example, a graph image, which is, for example, the statistical data shown in FIG. 2B) may overlap with each other.

In each of the first and second embodiments, the case where the code image determination unit, the processing unit, the JPEG processing unit, the decompression unit, and the storage processing unit are hardware controlled by the CPU has been described. However, the present invention can also be realized in a case where the units are functions that can be attained when the CPU executes various programs stored in the storage unit.

The various programs may be stored in a computer-readable storage medium. In this case, an aspect of the present invention can also be achieved by loading a program stored in the computer-readable storage medium to the RAM or the like and by executing the loaded program by the CPU.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-071125 filed Mar. 15, 2006, which is hereby incorporated by reference herein in its entirety.

What is claimed is:

1. An image processing apparatus comprising:
 a first unit configured to lossy-compress an original image;
 a second unit configured to determine whether the original image that has not been subjected to lossy compression contains a code image, and to extract the code image from the original image that has not been subjected to lossy compression when it is determined that the original image that has not been subjected to lossy compression contains a code image;
 a third unit configured to store the original image lossy-compressed by the first unit in a storage unit and expand the original image stored in the storage unit; and
 a fourth unit configured to transmit the expanded lossy-compressed original image to a printing unit,
 wherein the first and second units perform processing in parallel and the fourth unit performs processing before completion of processing of the second unit.

2. The image processing apparatus according to claim 1 wherein the printing unit is configured either to form the original image on a sheet or to transmit the original image to another apparatus.

3. The image processing apparatus according to claim 1, wherein the second unit, in addition to the code image extraction, further extracts information from the extracted code image.

4. The image processing apparatus according to claim 3, wherein the second unit, in addition to the information extraction, forms a new code image based on the extracted information.

5. The image processing apparatus according to claim 4, wherein the second unit forms the new code image in accordance with resolution of an output direction where the original image expanded by the third unit is output.

6. An image processing method for an image processing apparatus, the method comprising steps of:
 lossy-compressing an original image;
 determining whether the original image that has not been subjected to lossy compression contains a code image;

extracting the code image from the original image that has not been subjected to lossy compression when it is determined that the original image that has not been subjected to lossy compression contains a code image;

storing the lossy-compressed original image in a storage unit;

expanding the original image stored in the storage unit; and transmitting the expanded lossy-compressed original image to a printing unit, wherein processing of the lossy-compressing and determining steps is performed in parallel and processing of the transmitting step is performed before completion of processing of the determining and extracting steps.

7. The image processing method according to claim 6, wherein the printing unit is configured either to form the original image on a sheet or to transmit the original image to another apparatus.

8. The image processing method according to claim 6, wherein the extracting step further comprises extracting information from the extracted code image.

9. The image processing method according to claim 8, wherein the extracting step further comprises forming a new code image based on the extracted information.

10. The image processing method according to claim 9, wherein the extracting step further comprises forming the new code image in accordance with resolution of an output direction where the expanded original image is output.

11. A computer-readable storage medium having stored thereon computer-executable instructions for performing a method for an image processing apparatus, the method comprising steps of:

lossy-compressing an original image;

determining whether the original image that has not been subjected to lossy compression contains a code image;

extracting the code image from the original image that has not been subjected to lossy compression when it is determined that the original image that has not been subjected to lossy compression contains a code image;

storing the original image lossy-compressed in a storage unit;

expanding the original image stored in the storage unit; and transmitting the expanded lossy-compressed original image to a printing unit, wherein processing of the lossy-compressing and determining steps is performed in parallel and processing of the transmitting step is performed before completion of processing of the determining and extracting steps.

12. The computer-readable storage medium according to claim 11, wherein the method further comprises forming, from the printing unit, the original image on a sheet or transmitting, from the printing unit, the original image to another apparatus.

13. The computer-readable storage medium according to claim 11, wherein the extracting step further comprises extracting information from the extracted code image.

14. The computer-readable storage medium according to claim 13, wherein the extracting step further comprises forming a new code image based on the extracted information.

15. The computer-readable storage medium according to claim 14, wherein the extracting step further comprises forming the new code image in accordance with resolution of an output direction where the expanded original image is output.

* * * * *